Aug. 30, 1955   L. A. GREEN   2,716,420
MOISTURE TRAP
Filed June 17, 1954
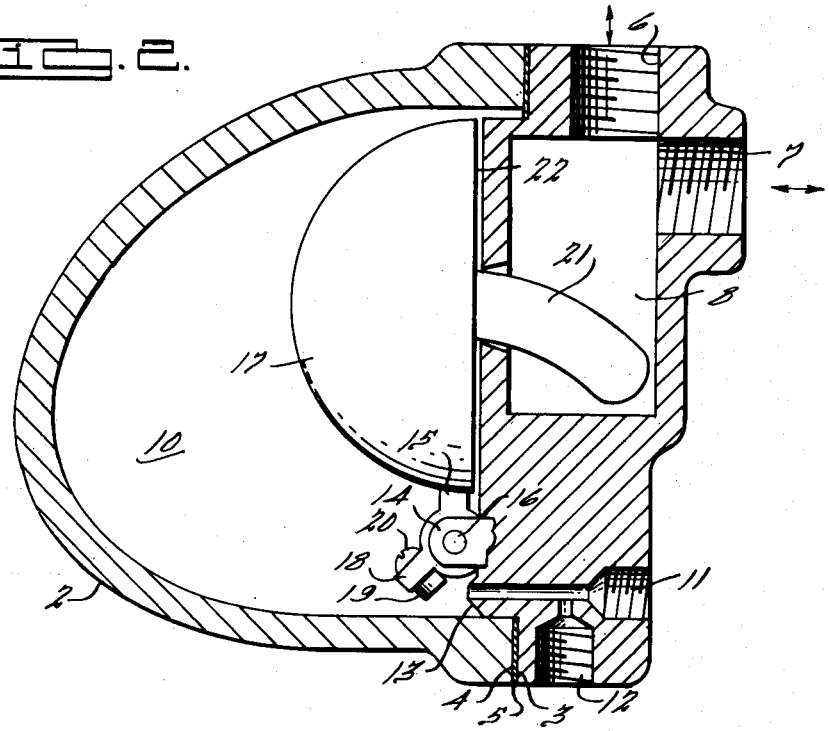
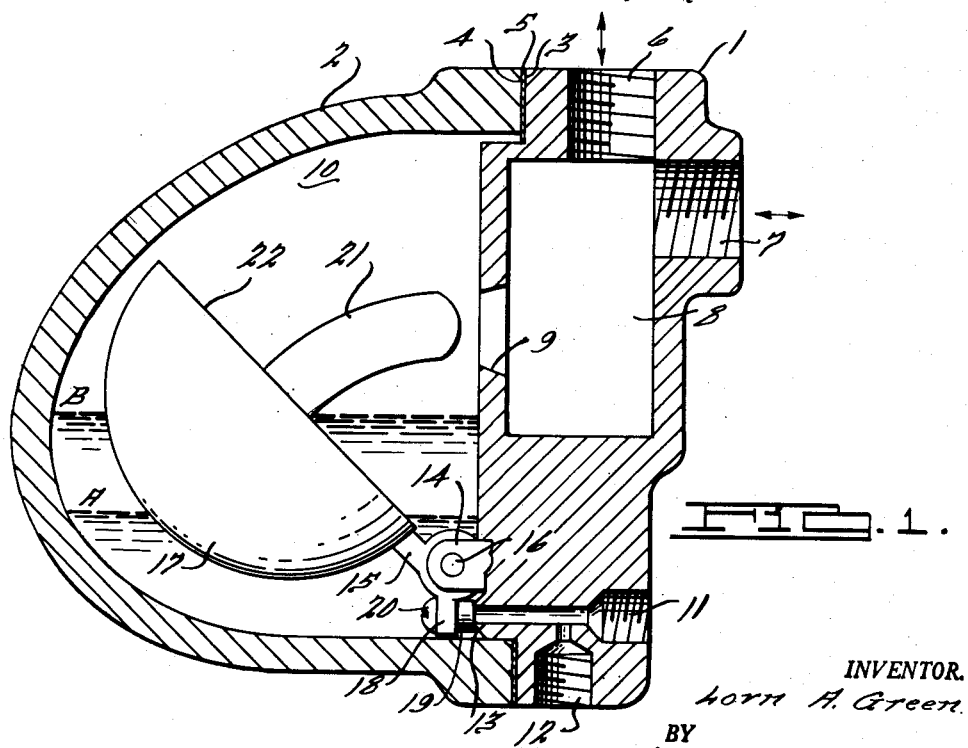
INVENTOR.
Lorn A. Green
BY
Harness, Dickey & Pierce
ATTORNEYS.

United States Patent Office 2,716,420
Patented Aug. 30, 1955

2,716,420
MOISTURE TRAP
Lorn A. Green, Miami, Fla.
Application June 17, 1954, Serial No. 437,546
3 Claims. (Cl. 137—193)

The present invention relates to moisture traps of the all-open, all-closed type for use in steam, air or gas lines. More specifically, the invention relates to an over-center float-type moisture trap of rugged construction and having few operating parts.

In the past, moisture traps for the removal of condensed moisture, condensed chemical vapors, and other entrained or vaporized liquids have been of two general types (1) the all-open, all-closed type, and (2) the gradually-opening, gradually-closing or throttle type. The latter generally are undesirable because any solid material, scale, or dirt interferes with their operation and maintenance is difficult since the wire-drawing effect of high pressure gases tends to eat away closely-adjusted valve and valve-seat surfaces. The all-open, all-closed type of moisture trap, while generally more satisfactory, has employed rather complicated mechanisms to hold the valve seated in the closed position and to hold it open wide in the open position. Many valves of this type have employed counterbalancing weights, rolling balls, intricate latches, delicate levers, springs, etc. All of these intricate parts, by virtual necessity, are located in the interior of the valve body and are exposed to rusting, corrosion, and the like in use. Maintenance, as a result, is excessive and often difficult.

It is the principal object of this invention, therefore, to provide a moisture trap having few moving parts, yet which is of massive and strong construction.

Another object is to provide a moisture trap of the all-open, all-closed type which has a fast-opening and fast-closing characteristic so as to prevent undue loss of gases from the system.

Still another object is to provide an over-center moisture trap which utilizes the differential in pressure existing between that of the gas system in which it is located and that of the discharge system to assist in quickly opening, quickly closing, and tightly seating the discharge valve mechanism.

Yet another object of this invention is to provide an over-center type of float-containing moisture trap which has a simplified construction such that corrosion, entrapped solids, and the like do not interfere with its operation.

Still other objects and advantages of the invention will become apparent from the description to follow taken in conjunction with an examination of the accompanying drawings, in which:

Figure 1 is an elevation in section of the moisture trap of this invention showing the moisture trap of this invention in the normal, upright position with the float and valve assembly in the closed or moisture-retaining position; and Fig. 2 is an elevation in section of the moisture trap of this invention with the float and valve mechanism shown in the open, moisture-discharging position.

In Fig. 1 of the drawings, the moisture trap of this invention will be seen to comprise a solid, circular base portion 1 in which are bored or machined all inlet and outlet ports, passages, valve seat, etc. and a curved or rounded cap or shell 2 which serves as the float bowl. The base portion 1 has a machined ring-like surface 3 about the circumference thereof and the bowl 2 has a cooperating-like surface 4. These machined surfaces are juxtaposed with a resilient gasket 5 of resilient material therebetween to prevent leakage from the bowl 2. The base 1 and bowl 2 are fastened together by flange bolts or clamps (not shown). The base portion 1 has two threaded inlet ports 6, 7 arranged at right angles and communicating with a cored-out inlet chamber 8. Although two inlet openings are shown at the top of chamber 8, it will be appreciated that one would be sufficient if gas circulation through the trap was not needed. The inlet ports 6, 7 are preferably located at the top of chamber 8, as shown, although other locations could be employed if desired. With the arrangement shown, however, gas, steam or other gas carrying condensed or entrained moisture, volatile liquid and the like may be passed through the trap in either direction, the abrupt change in the direction of flow and the enlarged volume of chamber 8 tending to deposit the entrained liquid therein. With two inlet ports arranged in this fashion, the valve can be mounted in a by-pass circuit with one of the inlet ports returning gas to the system to a higher downstream point. Since the trap is usually located in the lowest section of pipe or attached to the bottom of a piece of equipment, condensed liquid also will tend to drain by gravity into the trap and collect in chamber 8. Communicating with chamber 8 is a passageway or tapered throat 9 that leads into the interior of the bowl compartment 10.

The base of the trap 1 also is provided with two discharge passages, one, indicated by the number 11 being horizontal and passing entirely through the base 1 to communicate with the bowl compartment 10 and the other, indicated by the numeral 12, being vertical and drilled into passageway 11 at some distance in from the ends of the latter. This arrangement of passages 11, 12 permits the optional use of either or two of separate discharge lines. Only one discharge passage could be utilized, if desired. At the inner end of passageway 11 and surrounding its inlet into chamber 10 is provided a tapered upstanding valve seat 13. While an upstanding valve seat of this shape and configuration is desirable, it is in no wise critical to the operation of the trap. Above the valve seat 13 is located an outwardly extending clevis-like bracket 14 in which a float arm 15 is pivotally secured by pin 16, the arm 15 being attached to a hollow float 17. A valve member arm 18 forming an integral extension of the float arm 15 is likewise pivoted between the sides of the clevis bracket 14. The valve arm 18 could be a separate member, if desired, having serrated teeth on its side cooperating with matching teeth in the float arm. In the valve arm 18 a replaceable valve member 19 is secured by a slot-headed bolt or screw 20. The valve member 19 is preferably of a heat- and corrosion-resistant resilient material such as rubber or plastic, or of metal if desired, and is shaped to cooperate with the upstanding valve seat 13. As shown, the valve arm 18 is at an angle with float arm 15 allowing the valve member 19 to contact the valve seat 13 when the float 17 is in the closed or down position and to be raised clear of the seat when the float is in the up or open, over-center position.

The float 17 is a hollow hemisphere having a relatively large, flat surface opposing the open throat 9. On this surface is attached a finger 21, preferably solid, of a heavy metal such as iron, lead, brass, and the like. The size, length, curvature and weight of the finger 21 is designed to act as a weight holding the float 17 down when the liquid level is low. When the bowl chamber 10 is nearly full, however, and a sufficient portion of the volume of float 17 is submerged, the weight of the finger 21 will be overcome, the float will rise, and the end of the finger 21 will be thrust through the throat 9. Thus the finger 21 will be raised to a downwardly-depending position so as to act as a weight tending to snap the float upwardly to the vertical position. More will be said about the finger 21 in the following description of the operation of the moisture trap.

In operation, the moisture trap of this invention functions in a novel way. Referring first to Fig. 1, as gas, vapors, etc. are circulated through inlet ports 6 and 7, moisture settles out and collects in chamber 8. When the level of this liquid reaches the throat 9, it overflows into the float chamber 10. As this overflow continues, the level in the float chamber soon reaches the level A at which it exerts just sufficient buoyancy to begin to lift the float 17 were it not for the weight of the finger 21. The float does not begin to move, therefore, until the liquid level is very nearly level with the edge of throat 9 (level B). At this level, the buoyancy of the submerged float is sufficient to overcome the weight of the finger and the tendency of the float to rise increases, the float arm meanwhile pivoting on the pin 16. This tendency to rise, however, is opposed for a time by the differential in gas pressure existing between chambers 8 and 10 on the one hand and the pressure (atmospheric usually) existing in the discharge ports 11 and 12 on the other hand, this differential operating on the surface of the discharge valve member 19. Though small, this pressure differential prevents the float from rising until an additional small amount of fluid collects in the bowl chamber 10. At this point, the float 17 rises slightly and thrusts the end of the finger 21 through the throat opening 9. Due to the curved shape of the finger, this upward movement unbalances the float 17. As this is done, the valve 19 begins to lift off its seat 13. This rapidly reduces the differential gas pressure and the float begins to rise at an accelerated pace. As this occurs, the downward and outward curvature of the finger 21 is thrust farther through throat 9 and adds more unbalanced weight to the float. This speeds the rise of the float 17 until the unbalanced weight of the finger 21 "snaps" the float 17 into the vertical, completely open position. This snapping action raises the valve member 19 completely free of the valve seat 13. In this latter position, the differential gas pressure forces fluid out of the bowl chamber 10 at an accelerated rate through discharge channels or ports 11, 12, the gas from the system leaking through throat 9 past the finger 21, to replace the liquid lost.

When all the liquid above the valve seat 13 has been discharged from the bowl chamber 10, high pressure gas, since it is of much lower viscosity than any liquid, begins to flow out passages 11, 12 at a greatly increased rate of flow. Due to the greatly constricted passageway then existing between the walls of throat 9 and the surface of finger 21, this greatly increased rate of flow causes a pressure differential between chambers 8 and 10. The finger 21 then acts as a piston and there is a tendency for it to move back through throat 9. The increased rate of flow also generates kinetic energy against the flat surface of float 17. This combined action throws a very small portion of the weight of float 17 and finger 21 to the left of the fulcrum of the pivot pin 16 and unbalances the float 17, the latter then falling freely to its lower or closed position. The combined weight of the falling float and finger is sufficient to "snap" the valve member 19 tightly down on valve seat 13 and seal the bowl chamber against further loss of gas or vapor. In this position, the same differential gas pressure is re-established and again tends to keep the valve member 19 seated on the valve seat 13. It will be appreciated that the diameter and weight of the float, and the length of its supporting arm, have to be balanced against the weight, length, diameter and curvature of the finger 21 for any given value in order to secure operation in the manner described.

Thus, the moisture trap just described incorporates an exceptionally fast-opening, fast-closing valve. There is only one moving part, the float and its attached valve arm. The parts are of massive and simple construction and are able to resist corrosive atmospheres without impairing their useful function. Since the valve never is in throttling position, the valve member and valve seat are but little exposed to corrosive or fouling liquids and gases. There is no large valve seat surface to collect solid particles of rust, scale, etc. such as are inevitably present in pipe lines. If such collect on the valve seat, the shape of the valve seat and the natural seating action of the valve parts displaces them. Due to the shell having two ports adapted to vertical positioning, the trap is easily opened for cleaning without removal of the float. The valve member is easily accessible and easily removed or replaced by loosening a single screw or slot-headed bolt. The valve seat is easily accessible for resurfacing with simple grinding tools. As a result of all these features, the moisture trap of this invention is simple and inexpensive to construct and maintain.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. A moisture trap having a base member and a removable float-enclosing cover sealed thereto, a float chamber located in said cover, a second chamber located in said base member in side-by-side relationship with said float chamber and having at least one inlet opening therein, a passageway connecting said chambers, an over-center float located in said float chamber and having attached thereto an upstanding, heavy and curved finger, said float being hingedly attached to an arm for up and down movement to an over-center position permitting a substantial portion of said finger to project through said passageway and downwardly into said second chamber, a discharge valve seat and a connecting discharge port located in said base member adjacent the point of attachment of said float arm, and a valve member connected to the said float arm so as to be lifted off said valve seat by the upward movement of said float and to be seated thereon by downward movement of said float, said finger and said connecting passageway being proportioned so as to throttle gas flow when said float is in the over-center position with the said finger opposed to said gas flow.

2. A moisture trap having a base member and a float-enclosing cover sealed thereto, a float chamber located in said cover, a second chamber, having at least two inlet openings therein, located in said base and in side-by-side arrangement with said float chamber, a tapered passageway connecting said chambers, an over-center hemispherical float located in said float chamber and having its flat circular surface face up when said valve is closed, an upstanding, heavy and curved finger of circular cross section attached to the center of said upper flat float surface, said float being attached to an arm hingedly suspended for up and down movement at a point beneath said passageway and in a position permitting a substantial portion of said finger to project through said passageway and downwardly into said smaller chamber when the said float is in overcenter position, a discharge valve seat and a connecting discharge port located in said base member adjacent the said point of attachment of said float arm, and a valve member attached to said float arm so as to be lifted off and re-seated on said valve seat by upward and downward movement, respectively, of said float, said float finger and said tapered connecting passageway being proportioned so as to throttle gas flow when said float is in the over-center position with the said flat float surface opposed to said gas flow.

3. A moisture trap as claimed in claim 1 and further characterized in that the said discharge port is equipped with a second discharge passageway interconnecting therewith to permit optional discharge connections.

References Cited in the file of this patent
UNITED STATES PATENTS

| 311,113 | Foskett | Jan. 20, 1885 |
| 790,602 | Swendeman | May 23, 1905 |